United States Patent
Watanabe et al.

[11] Patent Number: 6,114,059
[45] Date of Patent: Sep. 5, 2000

[54] CYLINDER-SHAPED SECONDARY BATTERY

[75] Inventors: Goro Watanabe; Kenichi Suzuki; Yoshiaki Ebine, all of Aichi-ken, Japan

[73] Assignee: Kabushiki Kaisha Toyota Chuo Kenkyusho, Aichi-gun, Japan

[21] Appl. No.: 09/100,968

[22] Filed: Jun. 22, 1998

[30] Foreign Application Priority Data

Jun. 27, 1997 [JP] Japan .................................. 9-171765

[51] Int. Cl.$^7$ ............................ H01M 2/02; H01M 10/04
[52] U.S. Cl. .............................. 429/120; 429/94; 429/82
[58] Field of Search ............................ 429/94, 82, 120, 429/164

[56] References Cited

U.S. PATENT DOCUMENTS

| | | |
|---|---|---|
| 3,490,949 | 1/1970 | Deschamps . |
| 4,262,064 | 4/1981 | Nagle . |
| 5,501,916 | 3/1996 | Teramoto et al. . |

FOREIGN PATENT DOCUMENTS

| | | |
|---|---|---|
| 620610 | 4/1994 | European Pat. Off. ....... H01M 10/04 |
| 0 620 610 | 10/1994 | European Pat. Off. . |
| 6-349460 | 12/1994 | Japan . |

*Primary Examiner*—Maria Nuzzolillo
*Assistant Examiner*—Mark Ruthkosky
*Attorney, Agent, or Firm*—Oblon, Spivak, McClelland, Maier & Neustadt, P.C.

[57] ABSTRACT

A cylinder-shaped secondary battery includes a container, and a rolled electrode. The container includes a cylinder-shaped inner member, a cylinder-shaped outer member, and a pair of ring-shaped end plates. The electrode is accommodated in the container in an electrically insulating manner, rolled spirally, and has a pair of tabs and a hollow formed therein and extending in an axial direction thereof. Moreover, the electrode includes a positive electrode, a negative electrode and a separator disposed between the positive electrode and negative electrode so as to separate them. The inner member of the container has opposite ends and a hollow formed therein and extending in an axial direction thereof, and is disposed in the axially-extending hollow of the electrode. The outer member of the container has opposite ends, and is disposed on a centrifugal side of the electrode. The end plates of the container close the opposite ends of the inner and outer members, and are pierced through by terminals of the battery in an electrically insulating manner. Moreover, the end plates are bonded to the opposite ends of the inner member and/or the outer member by welding. The thus constructed battery has such good heat-radiating ability and high pressure resistance that it can stably carry out its functions.

10 Claims, 5 Drawing Sheets

CYLINDER-SHAPED SECONDARY BATTERY

BACKGROUND OF THE INVENTION

1. Field of the Invention

The present invention relates to a secondary battery. More particularly, it relates to a secondary battery which can efficiently radiate the heat generated during the service, which is less likely to suffer from the electrolyte-leakage problems resulting from the internal-pressure increment, and which can stably carry out its functions.

2. Description of Related Art

In secondary batteries, such as lithium-ion batteries, the positive electrode and negative electrode usually employ a sheet-shaped electrode in order to take out electricity efficiently. The sheet-shaped electrodes are prepared by coating an active material thinly on a metallic sheet. The resulting sheet-shaped electrodes are faced with each other while interposing a separator therebetween. Moreover, in large-sized batteries (i.e., batteries of large capacity) used in electric vehicles, the positive electrode and negative electrode are required to have an enlarged area, but to be accommodated in a battery container compactly. In particular, the secondary batteries, referred to as cylinder-shaped batteries, employ electrode sheets which are made long and continuous. The long-and-continuous electrode sheets are rolled by using a mandrel for rolling, thereby preparing a cylindrically-formed electrode. The resulting cylindrically-formed electrode is accommodated in a cylinder-shaped container. Finally, the cylinder-shaped container is closed at the opposite ends by bonding in an air-tight manner.

When the secondary batteries are charged or discharged, they generate heat by the internal resistance. Especially, the large-sized secondary batteries produce a larger amount of heat, because a large electric current flows therein. Accordingly, it is necessary to suppress the internal-pressure increment resulting from the generation of heat, and to provide adequate pressure resistance for the battery container. In particular, the cylinder-shaped batteries produce a large amount of heat, and radiate the generated heat only at the outer peripheral portion and the opposite disk-shaped members limitedly. Accordingly, the cylinder-shaped batteries carry out the radiation of heat insufficiently at portions adjacent to the center of rolling. As a result, the internal pressure increases so that there occurs the warpage at the opposite disk-shaped members, and furthermore there arise the electrolyte-leakage problems at the bonding between the cylinder-shaped container and the opposite disk-shaped members.

Japanese Unexamined Patent Publication (KOKAI) No. 6-349,460 proposes one of the measures for inhibiting the large-sized batteries from increasing the temperature: for instance; a column-shaped battery is hollowed along the central axis to utilize the resulting hollow as a cooling cylinder. According to the technique, an inner cylinder is made from an electrically-conductive metal, and is used as an external terminal of a positive electrode or a negative electrode. Moreover, disk-shaped plates are disposed at the opposite ends of a container of the column-shaped battery; and at least one of the disk-shaped plates is bonded to the inner cylinder and an outer cylinder of the container by caulking, or is fastened thereto with screws, by way of an insulating gasket or packing in an air-tight manner.

In the application to electric vehicles, it is essential to connect the independent large-sized batteries in series in a quantity of about 100 in order to produce an output voltage of about 300 V. In addition, it is needed to gather them compactly. The large-sized batteries of the above-described conventional construction employ a battery container which works as the external terminal as well. Consequently, when the battery containers are brought into contact with each other, there occurs short-circuiting between the electrodes. Hence, when assembling the conventional large-sized batteries together, it is necessary to put an insulating cover on an outer periphery of the containers. As a result, there arises the problem in that the covers impair the heat radiation off from the conventional large-sized batteries. In addition, when the heat is generated at the central portion of the conventional large-sized batteries, the heat not only radiates off directly from the inner periphery of the inner cylinder, but also transfers to the opposite end plates. Therefore, it is needed to radiate the heat off from the surface of the opposite end plates. In the conventional technique disclosed in the publication, however, the heat is inhibited from transferring to the opposite end plates, because the end plates are bonded to the inner cylinder, or fastened thereto with screws, by way of the insulating member, or the like. Thus, there arises the problem in that the heat radiation cannot be carried out sufficiently. Moreover, the end plates are bonded to the outer and inner cylinders, for example, by caulking. Accordingly, the bonding strength is low between the end plates and the outer and inner cylinders. Thus, it is difficult to provide the air-tightness between the outer and inner cylinders and the end plates.

SUMMARY OF THE INVENTION

The present invention has been developed in view of the aforementioned circumstances. It is therefore an object of the present invention to provide a secondary battery which can efficiently radiate the heat generated during the service, which is less likely to suffer from the electrolyte-leakage problems resulting from the internal-pressure increment, and which can stably carry out its functions.

A cylinder-shaped secondary battery according to the present invention comprises:

a container including a cylinder-shaped inner member, a cylinder-shaped outer member, and a pair of ring-shaped end plates; and a rolled electrode including a positive electrode, a negative electrode and a separator disposed therebetween, the rolled electrode being accommodated in the container in an electrically insulating manner, rolled spirally, having a pair of tabs and a hollow formed therein and extending in an axial direction thereof, the cylinder-shaped inner member having opposite ends and a hollow formed therein and extending in an axial direction thereof and disposed in the axially-extending hollow of the rolled electrode, the cylinder-shaped outer member having opposite ends, and disposed on a centrifugal side of the rolled electrode, the ring-shaped end plates closing the opposite ends of the cylinder-shaped inner and outer members, and being pierced through by terminals of the cylinder-shaped secondary battery in an electrically insulating manner, the ring-shaped end plates being bonded to the opposite ends of the cylinder-shaped inner member and/or the cylinder-shaped outer member by welding.

As described above, the present cylinder-shaped secondary battery has the hollow which extends in the axial direction, and includes the container which is bonded at the opposite ends by welding. In the thus constructed present cylinder-shaped secondary battery, the heat can be transferred from the central portion to the opposite ends smoothly. As a result, the heat generated at the central portion of the present cylinder-shaped secondary battery is likely to be expelled from the cylinder-shaped inner member by way of the end plates disposed at the opposite ends.

Moreover, in the present cylinder-shaped secondary battery, the battery container involving the cylinder-shaped inner member is electrically insulated with respect to the positive electrode and negative electrode of the rolled electrode. Consequently, there arises no problem even if the independent present cylinder-shaped secondary batteries are stacked to bring the battery containers into contact with each other. This advantage is effective in the application of the present cylinder-shaped secondary battery to the electric vehicles, where a plurality of batteries are usually connected in series during the service. Specifically, the present cylinder-shaped secondary battery can get rid of the insulating cover which has been indispensable for the battery container of the conventional batteries. In the conventional batteries, the insulating cover inhibits the heat generated in the conventional batteries from radiating. On the other hand, even when heat is generated in the present cylinder-shaped secondary battery, the heat is likely to be expelled to the outside because no heat-radiation hindering element exists in the present cylinder-shaped secondary battery.

In most cases, the present cylinder-shaped secondary battery can be adequately cooled to radiate the heat by natural air-cooling or air-blowing. However, under severer service conditions where the present cylinder-shaped secondary battery generates more heat, the cylinder-shaped inner members of the independent present cylinder-shaped secondary batteries can be connected with each other by using metallic pipes to directly flow a coolant therein. If such is the case, there hardly occur the problems resulting from the electrochemical corrosion.

Thus, the present cylinder-shaped secondary battery can radiate the heat generated therein efficiently, and can keep the internal pressure increment minimum. Moreover, even when the internal pressure increases, the present cylinder-shaped secondary battery little suffers from the electrolyte-leakage problems, because the container is joined by welding to exhibit high strength. All in all, the present cylinder-shaped secondary battery can stably carry out its functions.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
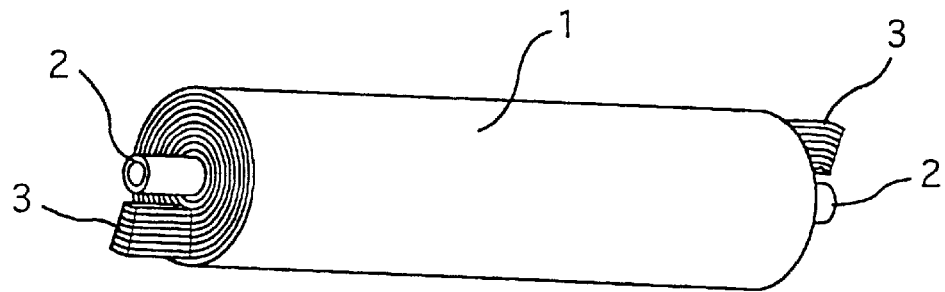
FIG. 1 is a perspective view for illustrating a rolled electrode in a First Preferred Embodiment of a cylinder-shaped secondary battery according to the present invention, i.e., a rolled electrode which is prepared by rolling a positive electrode, a separator and a negative electrode around a cylinder-shaped inner member.

Having generally described the present invention, a further understanding can be obtained by reference to the specific preferred embodiments which are provided herein for purposes of illustration only and are not intended to limit the scope of the appended claims.

A cylinder-shaped secondary battery according to the present invention comprises a container, and a rolled electrode. The rolled electrode is accommodated in the container in an electrically insulating manner, and is rolled spirally. Further, the rolled electrode has a pair of tabs, and a hollow extending in an axial direction thereof. Furthermore, the rolled electrode includes a positive electrode, a negative electrode, and a separator disposed between the positive electrode and negative electrode so as to separate them.

The container includes a cylinder-shaped inner member, a cylinder-shaped outer member, and a pair of ring-shaped end plates. Accordingly, the container is a cylinder-shaped container whose opposite ends are closed by the ring-shaped end plates. Note that the container can be configured to a cylinder shape, a squared-tube shape, or the like, in cross-section. The term "cylinder shape" herein means a complete circle, an ellipse shape, or the like, in cross-section. The term "squared-tube shape" herein means a rectangular shape, a square shape, a triangular shape, or the like, in cross-section.

The cylinder-shaped inner and outer members can be pipes of different inside and outside diameters, for example. The cylinder-shaped outer member has a length so that it can accommodate the rolled electrode therein. The cylinder-shaped inner member has a length that can be equal to or more than the length of the cylinder-shaped outer member. Further, the cylinder-shaped inner member has an outside diameter smaller than the inside diameter of the cylinder-shaped outer member. Accordingly, the cylinder-shaped inner member can be disposed in the cylinder-shaped outer member. Furthermore, the cylinder-shaped inner member has an outside diameter which can be within 50%, preferably from 10 to 20%, of the outside diameter of the rolled electrode. Moreover, the cylinder-shaped inner member can have a thickness of from 0.2 to 2 mm, preferably from 0.8 to 1.5 mm. Note that, however, the dimensional specifications of the cylinder-shaped inner member cannot be determined in general because they should be determined in view of the heat-radiating ability for the heat generated in the resulting present cylinder-shaped secondary battery as well as in view of the following factors: the winding ability of the positive electrode, negative electrode and separator of the rolled electrode, the welding ability of the cylinder-shaped inner member for constituting a battery container, and the reinforcing ability for the end plates. In addition, the cylinder-shaped outer member can have an inside diameter which is from 0.2 to 2 mm larger than, preferably from 0.5 to 1.5 mm larger than the outside diameter of the rolled electrode, and can have a thickness of from 0.2 to 2 mm, preferably from 0.5 to 1.5 mm.

The ring-shaped end plates can include a ring-shaped body, a terminal, and a through hole formed at the central portion of the body. The terminals of the end plates can be an external terminal and an internal terminal of the present cylinder-shaped secondary battery, and can be fitted into and fastened into the bodies of the end plates in an electrically insulating manner. The internal terminals are connected with the tabs of the rolled electrode. The cylinder-shaped inner member is fitted into the through hole of the end plates. The end plates can be formed as a ring-shaped disk, respectively. Note that the term "ring-shaped" herein means a complete circle, an ellipse, a rectangle, a square, a triangle, or the like. Further, the ring-shaped disk has an outside diameter which can be identical with the outside diameter of the cylinder-shaped outer member. Alternatively, the ring-shaped disk has an outside diameter which can fall between the outside diameter of the cylinder-shaped outer member and the inside diameter thereof. Furthermore, the ring-shaped disk has an inside diameter which can be identical with the outside diameter of the cylinder-shaped inner member. Alternatively, the ring-shaped disk has an inside diameter which can fall between the outside diameter of the cylinder-shaped inner member and the inside diameter thereof.

As described above, the container includes the cylinder-shaped inner member, the cylinder-shaped outer member, and the ring-shaped end plates. The container can be made from materials having excellent thermal conductivity, weldability and corrosion resistance. For instance, the container can preferably be made from stainless steel, nickel-plated steel, copper, copper alloy, aluminum or aluminum alloy.

The rolled electrode includes a positive electrode, a negative electrode and a separator. It is prepared by rolling the positive electrode, separator and negative electrode spirally. Thus, in the rolled electrode, the positive electrode and negative electrode are separated from each other by the separator. The positive electrode, negative electrode and separator are not limited in particular in the present invention, and accordingly can be those used in ordinary secondary batteries.

The rolled electrode is made electrically insulated from the cylinder-shaped inner and outer members of the container in the following manner. For instance, when preparing the rolled electrode, the constituent strip-shaped separator can be made longer than the constituent positive electrode and negative electrode at the opposite ends so as to be rolled at the opposite ends by a couple of extra turns, specifically, from 2 to 3 turns, at the beginning of the rolling and after the completion of the rolling. Moreover, the cylinder-shaped inner member can be used as the mandrel for rolling the constituent strip-shaped positive electrode, negative electrode and separator of the rolled electrode.

The electricity can be taken out of the present cylinder-shaped secondary battery as follows. For instance, the rolled electrode can be provided with a pair of electrode tabs. The electrode tabs work as the current collector of the rolled electrode. Then, the electrode tabs of the rolled electrode are connected with the internal terminals of the ring-shaped end plates. The connection can be carried out by any one of the following methods: for example; fastening with a screw, caulking, spot welding and ultrasonic welding.

In the conventional batteries, the cylinder-shaped member and the plate are electrically insulated from each other by using a packing, because a part of the container must work as the electrode as well. On the other hand, in the present cylinder-shaped secondary battery, the ring-shaped end plates can be bonded to the cylinder-shaped inner and outer members directly. Thus, in the present cylinder-shaped secondary battery, no insulating member, such as a packing, is required, because the container is electrically insulated from the terminals of the rolled electrode. As a result, the abutting portions of the container can be bonded directly with each other. The container can be bonded by any one of the following metallic bonding processes: for example; soldering, brazing, arc welding and laser welding. In view of avoiding the adverse thermal influences against the rolled electrode, such as the fusion loss of the positive electrode and negative electrode into the separator in particular, it is preferred to employ the laser welding for the operation, because the laser welding can locally heat only the joints to be welded.

FIRST PREFERRED EMBODIMENT

Figure 4:
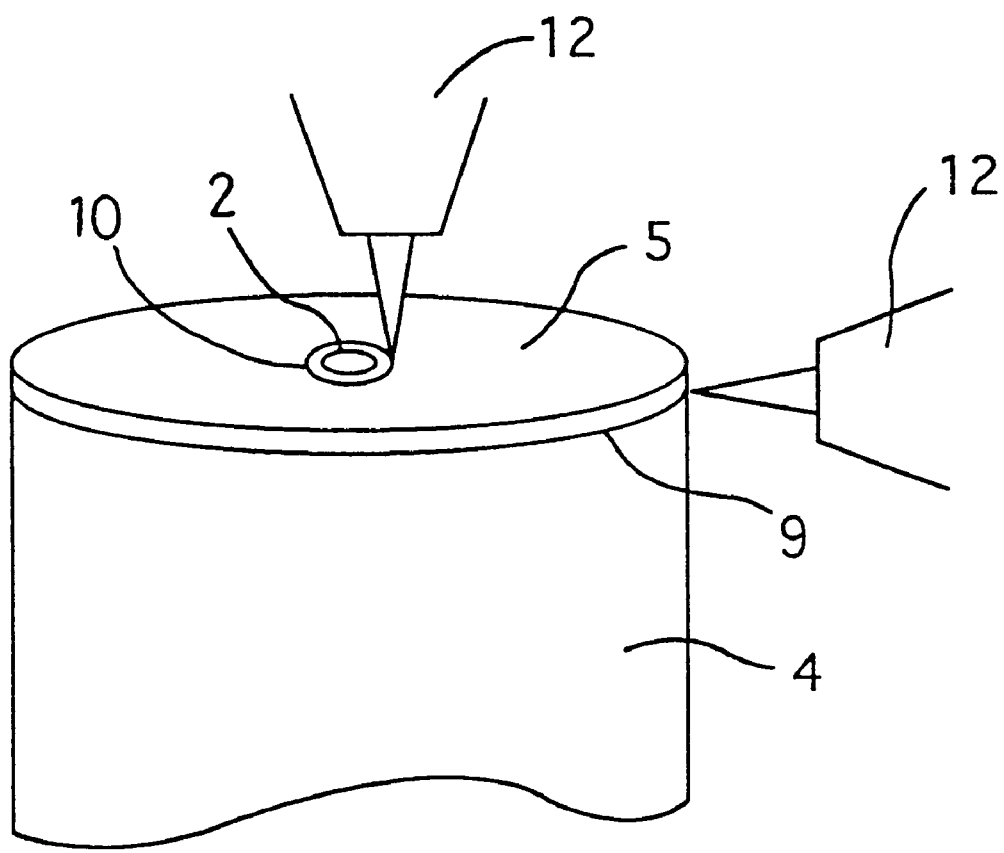
FIG. 4 is a schematic perspective view for illustrating how the end plates are bonded to the cylinder-shaped inner and outer members by welding in the First Preferred Embodiment of the present cylinder-shaped secondary battery.
Figure 5:
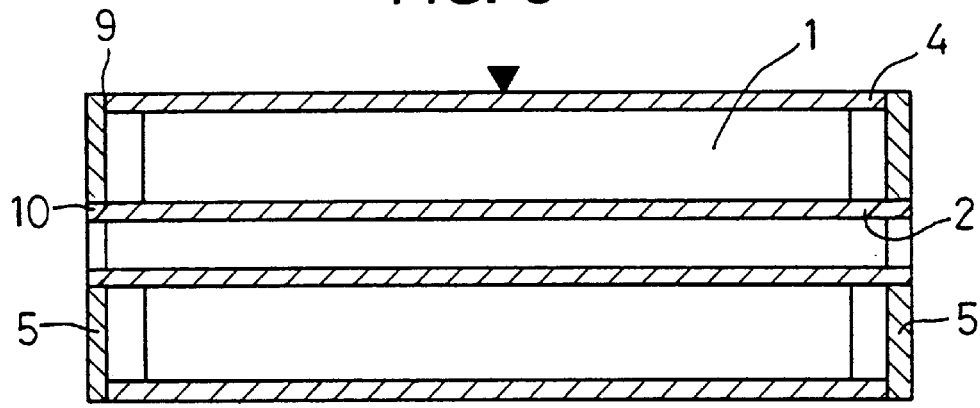
FIG. 5 is a schematic axial cross-sectional view for illustrating the First Preferred Embodiment of the present cylinder-shaped secondary battery.

FIGS. 1 through 5 illustrate a First Preferred Embodiment of a cylinder-shaped secondary battery according to the present invention. The First Preferred Embodiment is a lithium-ion battery, and is prepared by rolling an electrode 1 around a cylinder-shaped inner member 2 working as a mandrel therefor as illustrated in FIG. 1. FIG. 5 shows the schematic axial cross-sectional view of the resulting First Preferred Embodiment.

Figure 2:
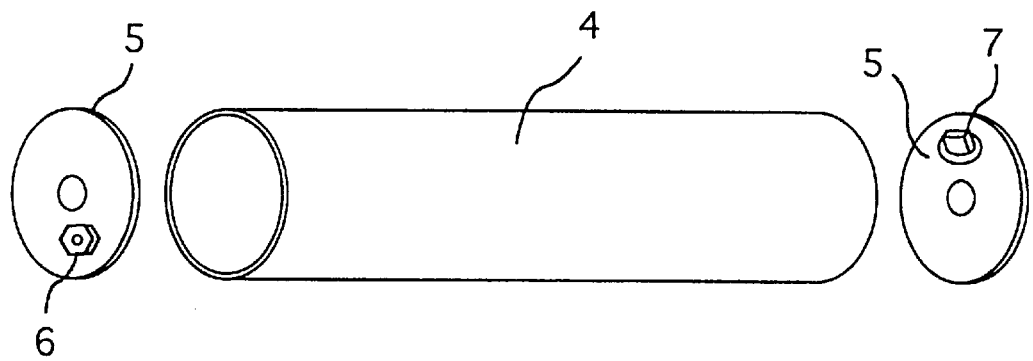
FIG. 2 is an exploded perspective view for illustrating a cylinder-shaped outer member and end plates of a container in the First Preferred Embodiment of the present cylinder-shaped secondary battery.
Figure 3:
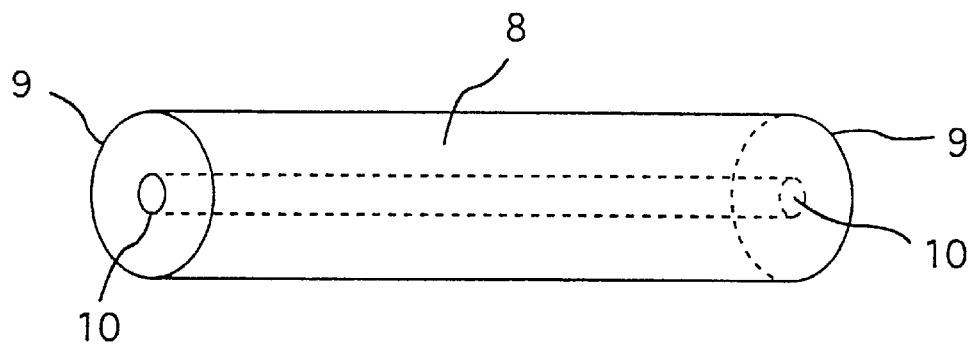
FIG. 3 is a schematic perspective view for illustrating the First Preferred Embodiment of the present cylinder-shaped secondary battery, in which the end plates are bonded to the cylinder-shaped outer and inner members.

As illustrated in FIGS. 1 and 2, a battery container of the lithium-ion battery includes the cylinder-shaped inner member 2, a cylinder-shaped outer member 4, and a pair of end plates 5, all of which are made from an aluminum alloy, for example, A3004 as per Japanese Industrial Standard. The inner member 2 is made of a pipe, and has a length of 420 mm, an outside diameter of 12 mm and an inside diameter of 8 mm. The outer member 4 is made of a pipe, and has a length of 416 mm, an outside diameter of 80 mm and an inside diameter of 77 mm. The end plates 5 are made of a disk-shaped plate, and has an outside diameter of 80 mm and a thickness of 2 mm. The end plates 5 are further provided with a through hole at the central portion, respectively. The through hole has a diameter of 12 mm. Accordingly, the inner member 2 can be fitted into the through hole of the end plates 5.

The rolled electrode 1 includes a positive electrode, a negative electrode, and a separator. The positive electrode is made of a strip-shaped metallic foil, and is prepared by coating lithium manganate thereon. The negative electrode is made of a strip-shaped metallic foil, and is prepared by coating graphite thereon. The separator is made of a strip-shaped porous film. The strip-shaped porous film is made from polyethylene. The electrolyte solution was an organic solution which contains $LiBF_4$ as a supporting electrolyte. The positive electrode and negative electrode have a width of 360 mm. The separator has a width of 390 mm.

The positive electrode, separator and negative electrode are superimposed in this order to prepare a strip-shaped electrode. In the strip-shaped electrode, the positive electrode and negative electrode are separated from each other by the separator. The resulting strip-shaped electrode is rolled around the cylinder-shaped inner member 2 to prepare the rolled electrode 1. In the preparation, the strip-shaped electrode is rolled until the rolled electrode 1 has a rolled diameter of 76 mm. The opposite ends of the inner member 2 are projected from the opposite ends of the rolled electrode 1 by 15 mm, respectively. Further, at the beginning of rolling the strip-shaped electrode, the separator is rolled around the inner member 2 by a couple of extra turns, for example, by 2 turns. Furthermore, after the completion of rolling the strip-shaped electrode, the separator is rolled around the inner member 2 by a couple of extra turns, for example, by 2 turns. As a result, the rolled electrode 1 is electrically insulated from the inner member 2 as well as the outer member 4.

The thus prepared rolled electrode 1 is accommodated in the cylinder-shaped outer member 4. Then, the outer member 4 is closed by the end plates 5 at the opposite ends. The abutting portions 10 between the end plates 5 and the inner member 2, and the abutting portions 9 between the end plates 5 and the outer member 4 are bonded by a laser welding process as illustrated in FIG. 4. The preparation of the First Preferred Embodiment of the present cylinder-shaped secondary battery is thus finished substantially. The schematic cross-sectional view of the resultant First Preferred Embodiment is depicted in FIG. 5. Note that, in the preparation, the electrode tabs 3 of the rolled electrode 1 are bonded to the internal terminal 7 of the end plates 5 by an ultrasonic welding process, thereby providing electrode terminals for the present cylinder-shaped secondary battery. Furthermore, the internal terminal 7 and external terminal 6 are electrically insulated from the end plates 5. Moreover, after bonding the abutting portions 9 between the end plates 5 and the outer member 4, and the abutting portions 10 between the end plates 5 and the inner member 2 with a laser welding machine 12 as illustrated in FIG. 4, an electrolytic solution is filled through an electrolytic-solution filling hole (not shown) which is provided for the end plate 5 of the battery container in advance. The electrolytic solution is an ordinary electrolytic solution for secondary batteries. Finally, the filling hole is sealed, thereby completing a large-sized lithium-ion battery (i.e., the First Preferred Embodiment of the present cylinder-shaped secondary battery).

For comparison, Comparative Example Nos. 1 and 2 (i.e., comparative cylinder-shaped secondary batteries) are further prepared by using the same raw materials as those of the First Preferred Embodiment as hereinafter described. Note that Comparative Example Nos. 1 and 2 include a cylinder-shaped inner member, a cylinder-shaped outer member, and end plates whose dimensional specifications are slightly different from those of the First Preferred Embodiment, but which are made from the identical raw material (e.g., the A3004 aluminum alloy) with those of the First Preferred Embodiment. Whilst, Comparative Example Nos. 1 and 2 include a rolled electrode whose arrangement is same as the rolled electrode 1 of the First Preferred Embodiment.

COMPARATIVE EXAMPLE NO. 1

Figure 6:
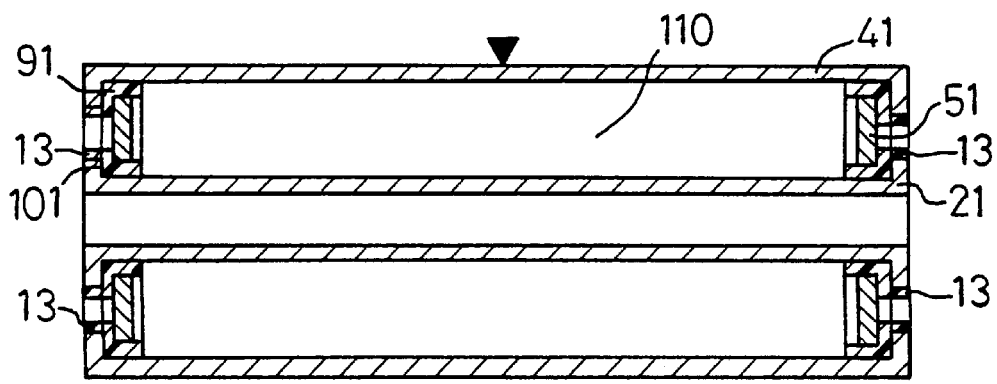
FIG. 6 is a schematic axial cross-sectional view for illustrating Comparative Example No. 1, a comparative cylinder-shaped secondary battery.

Comparative Example No. 1 is a cylinder-shaped secondary battery whose schematic axial cross-sectional view is illustrated in FIG. 6. Note that, in Comparative Example No. 1, insulating members 13 are interposed between ring-shaped end plates 51 and cylinder-shaped inner and outer members 21 and 41 to hinder the heat transfer among them. The insulating members 13 are made from resin, and are formed as an annular shape. Specifically, Comparative Example No. 1 has a hollowed construction, in which the opposite abutting ends 91 between the outer member 41 and the end plates 51, and the opposite abutting ends 101 between the inner member 21 and the end plates 51 are bonded by caulking.

For instance, the cylinder-shaped inner member 21 is made of a pipe, and has a length of 430 mm, an outside diameter of 12 mm and an inside diameter of 8 mm. The cylinder-shaped outer member 41 is made of a pipe, and has a length of 430 mm, an outside diameter of 80 mm and an inside diameter of 77 mm. The end plates 51 are made of a disk-shaped plate, and have an outside diameter of 73 mm, an inside diameter of 16 mm, and a thickness of 2 mm. Accordingly, the end plates 51 have a through hole of 16 mm in diameter at the central portion.

The cylinder-shaped secondary battery of Comparative Example No. 1 is prepared in the following order: a rolled electrode 110 is prepared around the cylinder-shaped inner member 21 in the same manner as the rolled electrode 1 of the First Preferred Embodiment; the rolled electrode 110 is accommodated in the cylinder-shaped outer member 41; the insulating members 13 are placed in the opposite inner peripheries of the outer member 41; the ring-shaped end plates 51 are disposed in the inner peripheries of the insulating members 13 to close the opposite ends of the outer member 41; and the opposite ends of the inner member 21 and outer member 41 are caulked to hold and fasten the end plates 51 in the opposite ends of the resulting cylinder-shaped secondary battery. Thus, in Comparative Example No. 1, the opposite abutting ends 91 between the outer members 41 and the end plates 51, and the opposite abutting ends 101 between the inner member 21 and the end plates 51 are bonded by caulking. Note that the other manufacturing processes, such as the bonding between the internal terminals of the end plates 51 and the rolled electrode 110 and the filling of the electrolytic solution, are carried out in the same manner as the First Preferred Embodiment.

COMPARATIVE EXAMPLE NO. 2

Figure 7:
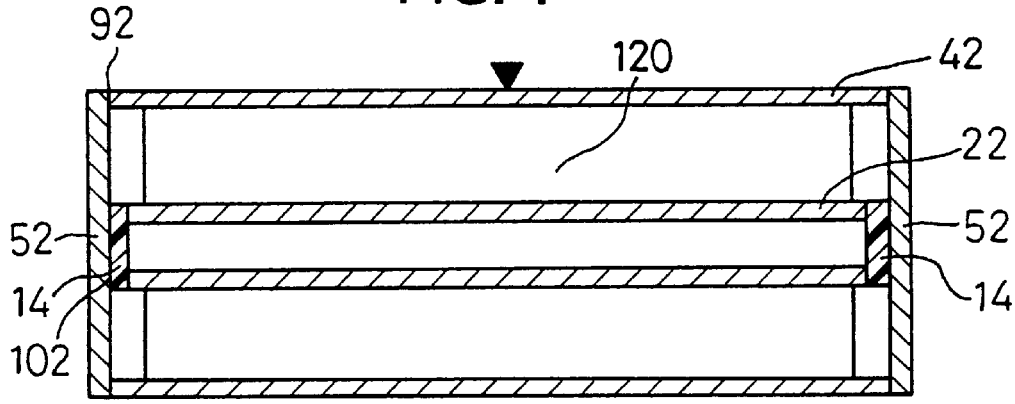
FIG. 7 is a schematic axial cross-sectional view for illustrating Comparative Example No. 2, another comparative cylinder-shaped secondary battery.

Comparative Example No. 2 is a cylinder-shaped secondary battery whose schematic axial cross-sectional view is illustrated in FIG. 7. Note that, in Comparative Example No. 2, flexible members 14 are disposed at the opposite ends of a cylinder-shaped inner member 22 to close the hollow therein, but not to bond between ring-shaped end plates 52 and the inner member 22. Consequently, the axial heat transfer is hindered internally between the end plates 52 and the inner member 22 or a rolled electrode 120. Specifically, Comparative Example No. 2 has an axially-extending hollow, in which no electrolytic solution is filled. Note that, in Comparative Example No. 2, the opposite abutting portions 92 between the end plates 52 and a cylinder-shaped outer member 42 are bonded by a laser welding process, and that the end plates 52 and the inner member 22 are faced with each other by way of the flexible members 14 made from resin.

For instance, the cylinder-shaped inner member 22 is made of a pipe, and has a length of 412 mm, an outside diameter of 12 mm and an inside diameter of 8 mm. The cylinder-shaped outer member 42 is made of a pipe, and has a length of 416 mm, an outside diameter of 80 mm, and an inside diameter of 77 mm. The end plates 52 are made of a disk-shaped plate, have an outside diameter of 80 mm and a thickness of 2 mm, and are free from a through hole at the central portion.

The cylinder-shaped secondary battery of Comparative Example No. 2 is prepared in the following order: a rolled electrode 120 is prepared around the cylinder-shaped inner member 22 in the same manner as the rolled electrode 1 of the First Preferred Embodiment; the rolled electrode 120 is accommodated in the cylinder-shaped outer member 42; the flexible members 14 are placed at the opposite ends of the inner member 22; the end plates 52 are disposed at the opposite ends of the outer member 42 to close the opposite ends thereof and the opposite abutting portions 92 between the end plates 52 and the outer member 42 are bonded by a laser welding process. Thus, in Comparative Example No. 2, the opposite abutting portions 92 between the end plates 52 and the outer member 42 are bonded by a laser welding process, however, the end plates 52 and the inner member 22 are not bonded but faced with each other by way of the flexible members 14. Note that the other manufacturing processes, such as the bonding between the internal terminals of the end plates 52 and the rolled electrode 120 and the filling of the electrolytic solution, are carried out in the same manner as the First Preferred Embodiment.

Performance Evaluation

The thus prepared First Preferred Embodiment of the present cylinder-shaped secondary battery, and Comparative Example Nos. 1 and 2 were subjected to the following tests to evaluate their performance.

Discharging Test on Independent Cylinder-Shaped Secondary Batteries

Figure 8:
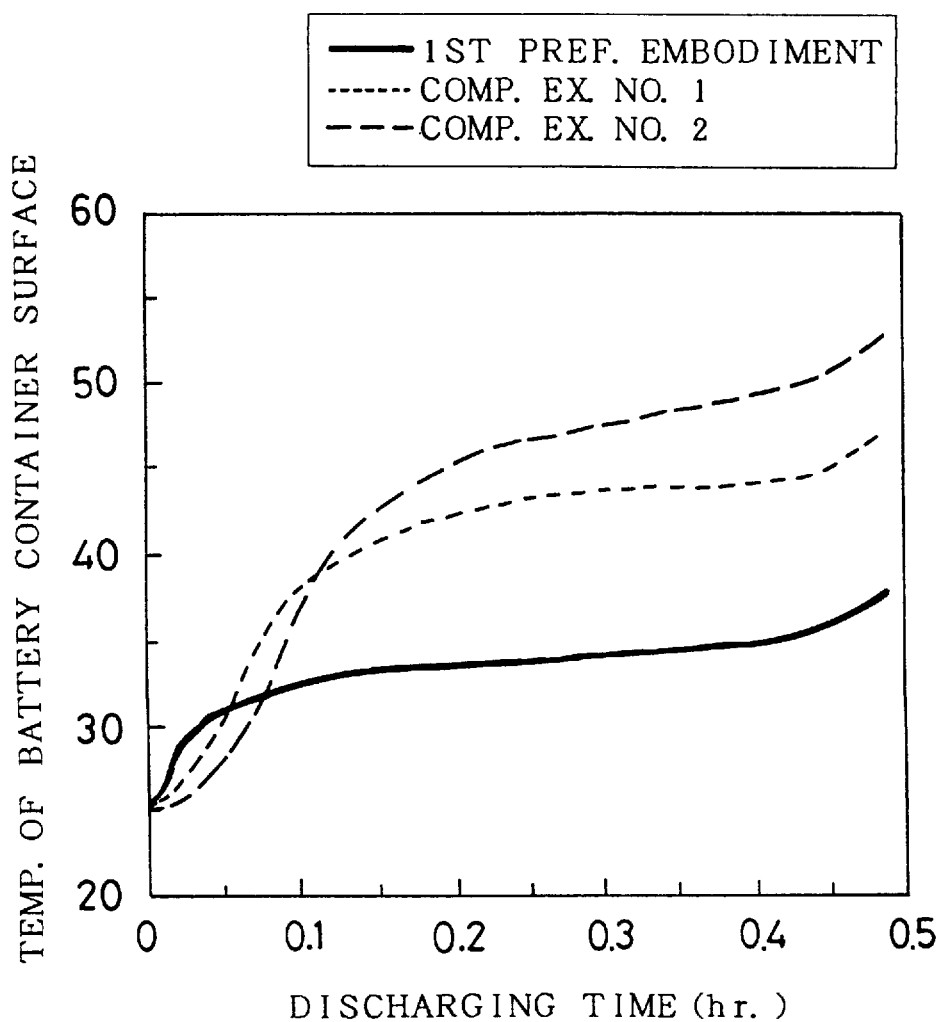
FIG. 8 is a graph for illustrating the results of a discharging test, i.e., a graph which depicts the relationships between the discharging time and the surface temperature exhibited by the battery containers of the First Preferred Embodiment, Comparative Example No. 1 and Comparative Example No. 2.

After the First Preferred Embodiment, Comparative Example No. 1 and Comparative Example No. 2 were fully charged, they were discharged to evaluate their heat-radiating abilities. Specifically, in the discharging test, the First Preferred Embodiment, Comparative Example No. 1, and Comparative Example No. 2 were examined for the temperature variations on their battery-container surfaces with respect to the discharging time. The First Preferred Embodiment, Comparative Example No. 1, and Comparative Example No. 2 were provided with a thermocouple at the middle, as specified with an inverted solid triangle in FIGS. 5, 6 and 7, respectively, to measure the temperature variations on their battery-container surfaces. FIG. 8 illustrates the results of the temperature-variation measurements on the surfaces of the cylinder-shaped secondary batteries during the discharging test. Note that all of the First Preferred Embodiment, Comparative Example No. 1 and Comparative Example No. 2 had an identical capacity of 100 Ah independently, and that they were discharged by flowing a current of 200 A at room temperature and were cooled by natural air-cooling.

According to FIG. 8, the First Preferred Embodiment exhibited a sharp temperature rise at the beginning of discharging. However, it thereafter showed an extremely gentle temperature increment which was kept about 38° C. at most. Thus, the temperature was increased only by about 13° C. from 25° C., room temperature. It follows that the First Preferred Embodiment having the hollowed and welded construction could efficiently radiate the heat generated in the battery container because the generated heat was transferred over the entire battery container.

On the other hand, Comparative Example No. 1 showed a slightly gentle temperature increment at first, but exhibited the maximum temperature of 47° C. at the end of discharging. Thus, it exhibited a temperature increment of about 22° C. from room temperature.

It is furthermore apparent from FIG. 8 that Comparative Example No. 2 exhibited the largest temperature increment. For example, Comparative Example No. 2 was 53° C. at the end of discharging. Thus, in Comparative Example No. 2, the temperature was increased maximally by about 28° C. from room temperature.

Battery Module Test

Ten pieces of the First Preferred Embodiment of the present cylinder-shaped secondary battery were prepared. Five pieces were lined to connect them in series, and another five pieces were also lined to connect them in series. The resulting two lines of the present cylinder-shaped secondary batteries were stacked in two stories, thereby preparing a battery module. Thus, in the resulting battery module, the battery containers were brought into contact with each other.

The battery module was subjected to a discharging-and-recharging test under a forced air-cooling condition. According to the discharging-and-recharging test, the independent present cylinder-shaped secondary batteries were found to generate heat, but not to exhibit the internal-pressure increment substantially. Thus, they were verified to have a good heat-radiating ability. Note that, however, the forced air-cooling was not carried out so as to flow the delivered air through the cylinder-shaped inner members 2 of the independent present cylinder-shaped secondary batteries in the axial direction thereof It follows that, even when the inner members 2 were not subjected to the forced air-cooling, the independent present cylinder-shaped secondary batteries could satisfactorily radiate the heat generated therein.

Pressure Resistance Evaluation

In addition, the First Preferred Embodiment of the independent present cylinder-shaped secondary battery was subjected to a pressure-resistance test in order to examine the pressure resistance of the battery container. Specifically, air was pressurized to 20 atm, and was blown into the battery container. Then, the appearance of the battery container was inspected visually. According to the result of the visual inspection, no warpage was observed in the opposite end plates 5 substantially. Hence, it was determined that the cylinder-shaped inner member 2 bonded to the end plates 5 could effectively work as the reinforcement.

Modified Versions of First Preferred Embodiment

The First Preferred Embodiment of the present cylinder-shaped secondary battery can be further improved in terms of the pressure resistance of the battery container. The improvement can be carried out, for example, by reinforcing the abutting portions 9 between the end plates 5 and the cylinder-shaped outer member 4, and the abutting portions 10 between the end plates 5 and the cylinder-shaped inner member 2. The reinforcements can inhibit the abutting portions 9 and 10 from deforming, thereby increasing the pressure at fracture. As a result, the battery container can be upgraded in terms of the pressure resistance.

For instance, it is possible to reinforce the abutting portions 9 between the end plates 5 and the cylinder-shaped outer member 4 by altering the bonding process from the welding process to a caulking process. Moreover, it is possible to reinforce the abutting portions 10 between the end plates 5 and the cylinder-shaped inner member 2 by installing a fitting which inhibits the end plates 5 from deforming outwardly. The fitting can be installed so as not to impair the heat-radiating ability of the hollowed inner member 2 of the present cylinder-shaped secondary battery. For example, a through bolt, or an anchor bolt can be fitted into the hollow of the inner member 2, and can be fastened by using a flanged nut which keeps the end plates 5 from warping.

The following Second and Third Preferred Embodiments of the present cylinder-shaped secondary battery, the modified versions of the First Preferred Embodiment, are presented herein in order to describe how the fitting is installed to the battery container. The Second and Third Preferred Embodiments will be hereinafter described with reference to FIGS. 9 and 10, respectively.

SECOND PREFERRED EMBODIMENT

Figure 9:
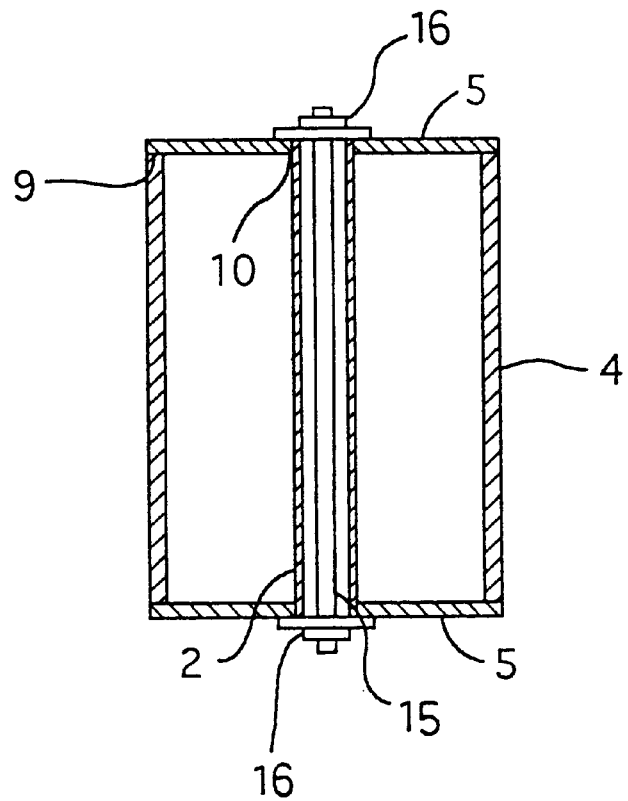
FIG. 9 is a schematic cross-sectional view for illustrating a Second Preferred Embodiment of the present cylinder-shaped secondary battery, i.e., a modified version of the First Preferred Embodiment, in which a rod is fitted into a hollow of a cylinder-shaped inner member of a battery container and is fastened by flanged nuts at the opposite ends to suppress deformation, whereby the pressure resistance of the battery container is enhanced.

As illustrated in FIG. 9, a rod 15 is fitted into the hollow of the cylinder-shaped inner member 2. The rod 15 is of a length that is larger than that of the battery container, and is threaded at the opposite ends. Moreover, a pair of flanged nuts 16 are prepared, and are adapted for suppressing the warpage in the end plates 5. The rod 15, and the flanged nuts 16 can be formed of either metal or resin. After the rod 15 is inserted into the inner member 2, the flanged nuts 16 are fastened to the opposite ends of the rod 15. The flanged nuts 16 hold the peripheries of the abutting portions 10 between the end plates 5 and the inner member 2 directly, and thereby inhibit the end plates 5 from deforming. As a result, the flanged nuts 16 can upgrade the pressure resistance of the battery container.

THIRD PREFERRED EMBODIMENT

Figure 10:
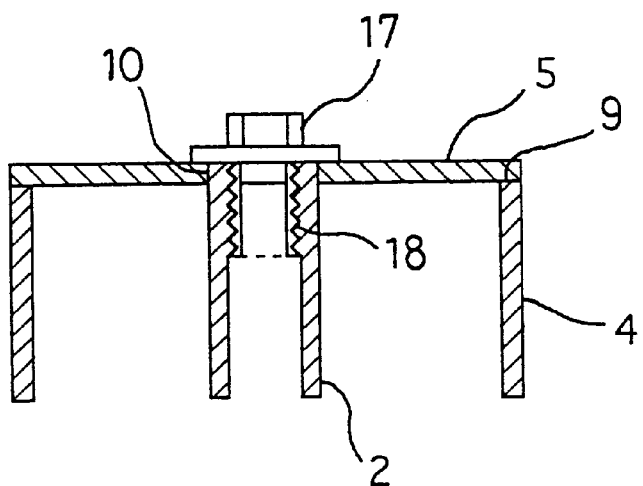
FIG. 10 is a schematic partial cross-sectional view for illustrating a Third Preferred Embodiment of the present cylinder-shaped secondary battery, i.e., another modified version of the First Preferred Embodiment, in which a cylinder-shaped inner member of a battery container is threaded on the inner periphery and a flanged bolt is screwed into the cylinder-shaped inner member to suppress deformation, whereby the pressure resistance of the battery container is enhanced.

The Third Preferred Embodiment employs a modified cylinder-shaped inner member 2. As illustrated in FIG. 10, the inner member 2 is threaded on the opposite inner peripheries to form threads 18, and a deformation-inhibiting flanged bolts 17 is screwed into the opposite ends of the inner member 2 directly. The flanged bolts 17 can be formed of either metal or resin. Note that FIG. 10 illustrates one of the opposite ends of the battery container only. The flanged bolts 17 hold the peripheries of the abutting portion 10 between the end plate 5 and the inner member 2 directly, and thereby inhibit the end plates 5 from deforming. As a result, the flanged bolts 17 can upgrade the pressure resistance of the battery container.

When the threads 18 are formed directly on the opposite inner peripheries of the cylinder-shaped inner member 2 which has a uniform thickness over the entire axial length, the inner member 2 comes to have a reduced thickness at the opposite ends. The reduced thickness may result in the strength deterioration at the opposite ends of the inner member 2. Hence, in the Third Preferred Embodiment, the inner member 2 can preferably have inner shoulders at the opposite ends. The inner shoulders have a thickness larger than that of the intermediate portion of the inner member 2 prior to the formation of the threads 18, and are thereafter processed to the threads 18.

Having now fully described the present invention, it will be apparent to one of ordinary skill in the art that many changes and modifications can be made thereto without departing from the spirit or scope of the present invention as set forth herein including the appended claims.

What is claimed is:

1. A cylinder-shaped secondary battery, comprising:

a container including a cylinder-shaped inner member, a cylinder-shaped outer member, and a pair of ring-shaped end plates, wherein said cylinder shaped inner member and said cylinder shaped outer member are connected without the intermediary of a heat insulating material; and a rolled electrode including a positive electrode, a negative electrode and a separator disposed therebetween, said rolled electrode being accommodated in said container in an electrically insulating manner with respect to said container, rolled spirally, having a pair of tabs and a hollow formed therein and extending in an axial direction thereof, said cylinder-shaped inner member having opposite ends and a hollow formed therein and extending in an axial direction thereof, and disposed in the axially-extending hollow of said rolled electrode, said cylinder-shaped outer member having opposite ends, and disposed on a centrifugal side of said rolled electrode, said ring-shaped end plates closing the opposite ends of the cylinder-shaped inner and outer members, and being pierced through by terminals of said cylinder-shaped secondary battery in an electrically insulating manner, and ring-shaped end plates being bonded to the opposite ends of the cylinder-shaped inner member and/or the cylinder-shaped outer member by welding.

2. The cylinder-shaped secondary battery according to claim 1, wherein the ring-shaped end plates are bonded to the opposite ends of the cylinder-shaped inner member of said container by fitting a threaded rod into the hollow of the inner member and fastening a flanged nut to the rod.

3. The cylinder-shaped secondary battery according to claim 1, wherein the ring-shaped end plates are bonded to the opposite ends of the cylinder-shaped inner member of said container by screwing a flanged threaded bolt into the hollow of the inner member.

4. The cylinder-shaped secondary battery according to claim 1, wherein said cylinder-shaped inner membrane has an outside diameter less than or equal to 50% of the outside diameter of the rolled electrode.

5. The cylinder-shaped secondary battery according to claim 4, wherein said cylinder-shaped inner member has an outside diameter being from 10 to 20% of the outside diameter of said rolled electrode.

6. The cylinder-shaped secondary battery according to claim 1, wherein said cylinder-shaped outer member has an inside diameter being from 0.2 to 2 mm larger than the outside diameter of the rolled electrode.

7. The cylinder-shaped secondary battery according to claim 6, wherein said cylinder-shaped outer member has an inside diameter being from 0.5 to 1.5 mm larger than the outside diameter of the rolled electrode.

8. The cylinder-shaped secondary battery according to Claim 1, wherein said cylinder-shaped inner member has a wall thickness of from 0.2 to 2 mm.

9. The cylinder-shaped secondary battery according to claim 8, wherein said cylinder-shaped inner member has a wall thickness of from 0.5 to 1.5 mm.

10. The cylinder-shaped secondary battery according to claim 1, wherein said rolled electrode has opposite ends in a direction of its rolling length;

the positive electrode and negative electrode of said rolled electrode have a predetermined length; and said separator of said rolled electrode is made longer than the length of the positive electrode and negative electrode at the opposite ends, and is rolled at the opposite ends by a few 2 or 3 times at the beginning of preparing the rolled electrode and after the completion thereof, thereby electrically insulating said rolled electrode from said cylinder-shaped inner and outer members.

* * * * *

UNITED STATES PATENT AND TRADEMARK OFFICE
CERTIFICATE OF CORRECTION

PATENT NO. : 6,114,059
DATED : September 5, 2000
INVENTOR(S): Goro Watanabe, et al.

It is certified that an error appears in the above-identified patent and that said Letters Patent is hereby corrected as shown below:

On the Title page, the Inventor's residence is listed incorrectly, also the CPA information has been omitted. It should read as follows:

---[45] Date of Patent: *Sep. 5, 2000 ---

---[75] Inventors: Goro Watanabe; Kenichi Suzuki; Yoshiaki Ebine, all of Aichi-gun, Japan ---

---[ * ] Notice: This patent issued on a continued prosecution application filed under 37 CFR 1.53(d), and is subject to the twenty year patent term provisions of 35 U.S.C. 154(a)(2). --

Signed and Sealed this

Fifteenth Day of May, 2001

Attest:

NICHOLAS P. GODICI

*Attesting Officer*      *Acting Director of the United States Patent and Trademark Office*